UNITED STATES PATENT OFFICE.

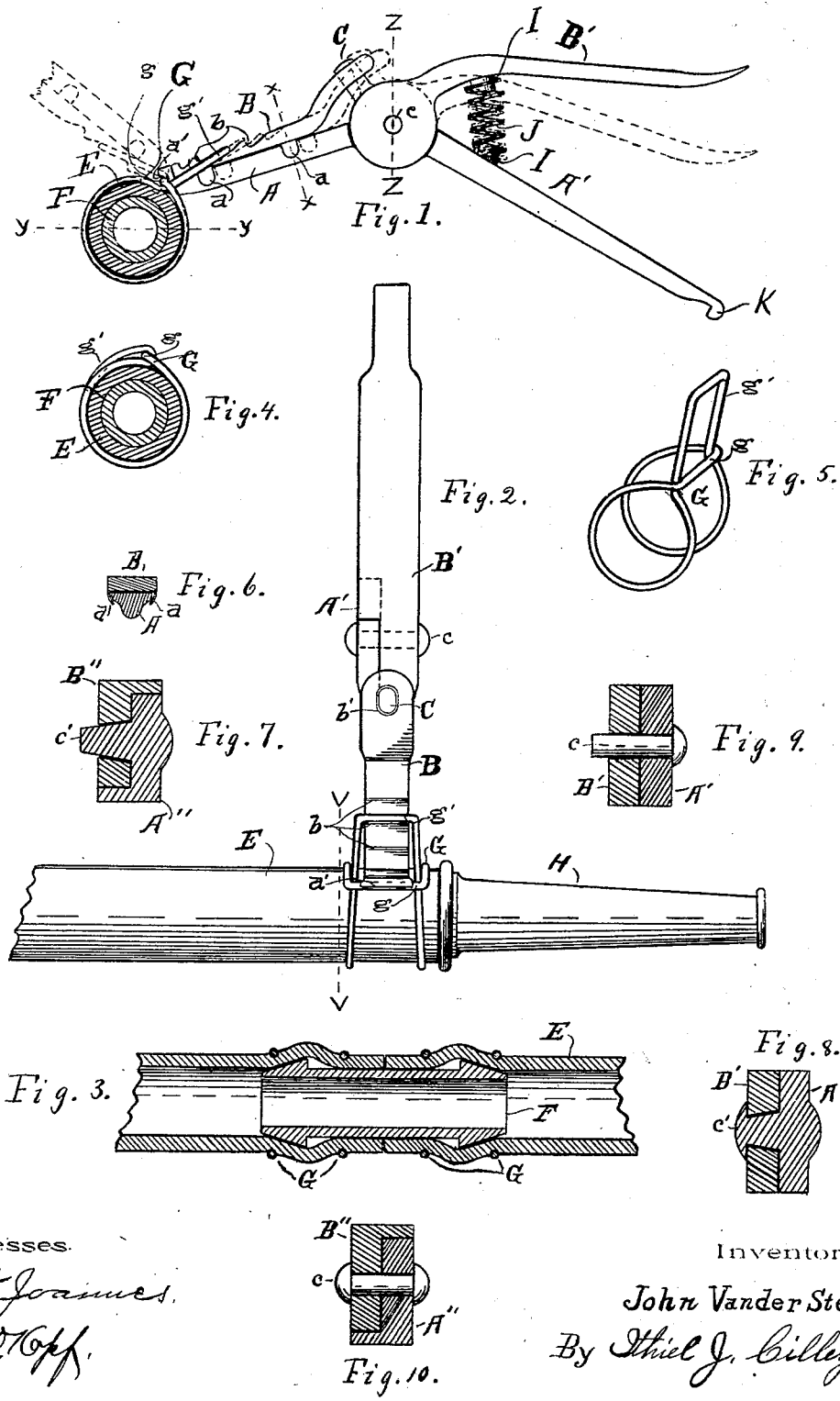

JOHN VANDER STEL, OF GRAND RAPIDS, MICHIGAN, ASSIGNOR TO ANDREW ALLGIER, OF SAME PLACE.

HOSE-COUPLING IMPLEMENT.

SPECIFICATION forming part of Letters Patent No. 638,823, dated December 12, 1899.

Application filed April 1, 1899. Serial No. 711,432. (No model.)

*To all whom it may concern:*

Be it known that I, JOHN VANDER STEL, a citizen of the United States, residing at Grand Rapids, in the county of Kent and State of Michigan, have invented certain new and useful Improvements in Hose-Coupling Implements, of which the following is a specification.

My invention relates to improvements in implements for coupling hose with wire bands around the hose for securing two pieces of hose together endwise over a coupling-core; and its objects are, first, to provide a hose-coupling implement that can be used for various lengths of wire bands for coupling garden-hose; second, to provide a fastener that will avert the danger of leakage when the wire bands are drawn to place; third, to provide an adjustable hose-coupling implement that can be used for various sizes of garden-hose; fourth, to provide a hose-coupling implement with which the folded end of the wire bands may be made to lie between the wires adjacent to the fold, and, fifth, to provide a hose-coupling implement having one end of the stationary member made broad to hold the sides of the wire band apart, so that the other end will pass freely through the loop and at the same time will move clear of it and avoid all friction on the edges of the the moving or sliding arm or member of the implement. I attain these objects by the mechanism illustrated in the accompanying drawings, in which—

Figure 1 is a side view of my implement, showing the manner of engaging the wire band for drawing it firmly around the hose. Fig. 2 is a plan of the same. Fig. 3 is a longitudinal section of a hose on the line $y$ $y$ of Fig. 1, showing the manner of splicing the hose. Fig. 4 is a transverse section of the same on the line $v$ $v$ of Fig. 2, showing the wire band folded to position to secure it upon the hose. Fig. 5 shows the wire band detached from the hose. Fig. 6 is a transverse section of the implement on the line $x$ $x$ of Fig. 1. Figs. 7, 8, 9, and 10 are transverse sections of the implement on the line $z$ $z$ of Fig. 1, showing the several kinds of pivot-joints that may be used in the construction of the implement.

Similar letters refer to similar parts throughout the several views.

A represents the lower member of the implement, which is made broad and flat on the upper side and tapers back, so that the lugs $a$ may be folded around, as shown in Fig. 6, to form a guide and support for the sliding member B. The member A and the handle A' are integral, and the handle B' is pivoted to it at $c$. This handle is provided with a short arm C, that passes through a small aperture $b'$ in the projecting arm of the sliding member B, so that when this handle is carried to the position indicated by the dotted lines the arm C will draw the sliding member endwise, as indicated by its dotted lines in Fig. 1. The band G is the wire band in common use and is applied to the hose E in the usual way—that is, by wrapping it snugly around the hose and bending the free end back, as shown in Fig. 4, to secure it to place. The prime object of my implement is to facilitate this action, and for this purpose I form a concave bearing $a'$ at the end of the member A, which is designed to receive and press against the end of the wire band, and upon the upper surface of the sliding member B, I form teeth or projections $b$, designed to receive the end $g'$ of the wire band, and when the band is placed around the hose and the implement applied to it, as stated, with the end $g'$ passing directly through, as indicated in Fig. 2, and the handle B', and with it the sliding member B, are drawn to the position indicated by the dotted lines the result must be to draw the band very tight around the hose when the implement is carried over to the position indicated by the dotted lines in Fig. 1. Using the end $g$ of the band and the bearing $a'$ of the implement as a pivot the end $g'$ of the band is carried over and wound partly around the end $g$, and not only prevents the band from lessening its tension around the hose, but draws it still tighter. When this end is carried over far enough to avert the danger of its becoming loosened, the implement is removed and the end $g'$ of the band pressed down between the sides of the band upon the surface of the hose.

The object of placing several of the teeth or projections $b$ on the surface of the sliding member B is to enable me to readily adjust the implement to different lengths of bands or to the placing of the bands upon different sizes of hose.

F represents an ordinary wooden coupling-core for hose, and H represents a hose-nozzle.

I represents lugs which act a double purpose—first, to hold the coil-spring J in proper position, and, second, to act as a stop when the two lugs I come together when operating the implement.

J represents a coil-spring to actuate the handle B' and to throw it back to its normal position.

K is a hook on the end of the stationary handle A' to catch on the end of the wire band at g' to draw it through the loop of the band around the hose ready to properly apply the implement, as shown in Fig. 1.

In Fig. 2 I show the end of the member A made wide at a' to hold the wire band apart, so that the other end will pass through the loop freely and avoid all friction on the edges of the sliding member B when the implement is being operated.

A', A'', B', and B'' in Figs. 7, 8, 9, and 10 represent the members of the implement in modified forms of pivot-joints, and at c I show an ordinary rivet, while at c' I show the rivet integral with one of the members.

Having thus fully described my invention, what I claim as new, and desire to secure by Letters Patent of the United States, is—

1. In a hose-coupling implement, a stationary member, a movable member pivoted thereto, an arm upon said movable member, a second movable member slidingly attached to the stationary member and provided with an aperture through which the arm on the pivoted member passes to actuate the sliding member, and teeth or projections on the sliding member to engage the end of a wire band to tighten it around a hose, substantially as, and for the purpose set forth.

2. In a hose-coupling implement, a stationary member, a movable member pivoted thereto, a second movable member slidingly attached to one end of the stationary member, said sliding member and pivoted member connected so that the motion of the pivoted member will actuate it to move longitudinal of the stationary member, said sliding member provided with teeth or projections to engage one end of a wire hose-band, and the end of the stationary member provided with a concave bearing to engage the other end of the band so that the drawing of the sliding member toward the pivoted member will draw the band tightly around the hose and will hold it until the implement is carried around to fasten it to place, substantially as, and for the purpose set forth.

3. In a hose-coupling implement, a stationary member, a sliding member secured thereto, a handle pivoted upon the stationary member and connected with the sliding member to actuate it longitudinal of the stationary member, said stationary member having its end made broad and provided with a groove to engage the wide end of the wire band, the sliding member made narrower and provided with teeth or projections to engage the narrower end of the wire band, and a spring for actuating the member, substantially as, and for the purpose set forth.

Signed at Grand Rapids, Michigan, March 28, 1899.

JOHN VANDER STEL.

In presence of—
I. J. CILLEY,
C. A. ELLIOTT.